(12) United States Patent
Lim

(10) Patent No.: US 7,315,344 B2
(45) Date of Patent: Jan. 1, 2008

(54) LIQUID CRYSTAL DISPLAY DEVICE AND METHOD OF FABRICATING THE SAME

(75) Inventor: Byoung Ho Lim, Gyeongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 174 days.

(21) Appl. No.: 10/725,055

(22) Filed: Dec. 2, 2003

(65) Prior Publication Data

US 2004/0125313 A1 Jul. 1, 2004

(30) Foreign Application Priority Data

Dec. 30, 2002 (KR) .................... 10-2002-0086560

(51) Int. Cl.
*G02F 1/13* (2006.01)
*G02F 1/136* (2006.01)
*G02F 1/1345* (2006.01)
*H01L 21/00* (2006.01)

(52) U.S. Cl. .................. 349/187; 349/43; 349/152; 438/30; 438/38; 438/951

(58) Field of Classification Search ............ None
See application file for complete search history.

(56) References Cited

U.S. PATENT DOCUMENTS

| 5,731,856 | A | * | 3/1998 | Kim et al. ............ 349/43 |
| 5,998,230 | A | * | 12/1999 | Gee-Sung et al. ........ 438/30 |
| 2002/0093600 | A1 | * | 7/2002 | Chol ................. 349/43 |

* cited by examiner

*Primary Examiner*—Andrew Schechter
*Assistant Examiner*—W. Patty Chen
(74) *Attorney, Agent, or Firm*—Morgan, Lewis & Bockius LLP

(57) ABSTRACT

A method of fabricating a liquid crystal display device includes forming a gate electrode, a gate bus line, and a gate pad on a substrate using a first mask process, forming a gate insulating layer and an active layer on an entire surface of the substrate, forming a first organic material film on an entire surface of the substrate, removing a portion of the first organic material film to expose a first portion of the gate pad, depositing a transparent film on an entire surface of the substrate, patterning the transparent film using a second half-tone mask to form a data bus line, a source electrode, a drain electrode, a pixel electrode, a channel layer, and an ohmic contact layer, exposing portions of the data pad and data bus line using a third mask, forming a second organic material film on an entire surface of the substrate, depositing a low resistance material on the data bus line, coating a passivation film on the substrate, removing the second organic material film using a lift-off process to expose a second portion of the gate pad and a first portions of the data pad.

13 Claims, 9 Drawing Sheets

LIQUID CRYSTAL DISPLAY DEVICE AND METHOD OF FABRICATING THE SAME

The present invention claims the benefit of Korean Patent Application No. 86560/2002 filed in Korea on Dec. 30, 2002, which is hereby incorporated by reference.

BACKGROUND OF THE INVENTION

1. Field of the Invention

The present invention relates to a display device and a method of fabricating a display device, and more particularly, to a liquid crystal display device and a method of fabricating a liquid crystal display device.

2. Description of the Related Art

In general, cathode ray tube (CRT) devices have been commonly used to display images. However, due to their size and weight limitations, the CRT devices are increasingly being replaced with liquid crystal display (LCD) devices that are small sized and lightweight, and have low profiles and low power consumption.

The LCD devices include an array substrate upon which thin film transistors (TFTs) are arranged, a color filter substrate upon which red, green, and blue color filter layers are formed and which is attached to the array substrate, and liquid crystal material interposed between the array and color filter substrates. The array and color filter substrates are formed by patterning and etching metal and insulating layers using photolithographic processes including several masking steps.

Fabrication of the array substrate includes a first mask step, wherein a metal layer is deposited onto a transparent glass substrate and then etched to form a gate bus line and a gate electrode. Next, during a second mask step, a gate insulating layer, an amorphous silicon film, and a doped amorphous silicon film are coated on the transparent glass substrate to form an active layer. Then, a third mask step includes depositing a source/drain metal film onto the glass substrate and patterning the metal film to form source/drain electrodes on the active layer and a data bus line. During a fourth mask step, a passivation film is deposited onto the glass substrate and a contact hole is formed in the passivation film. Then, during a fifth mask step, an ITO transparent film is deposited onto the substrate and etched to form a pixel electrode.

Since manufacturing costs are dependent upon the total number of masking steps used to fabricate the array substrate, significant consideration has been given to reduce the total number of masking steps. Accordingly, the third and fourth mask steps can be combined to reduce the total number of masking steps to four masking steps. In order to successfully perform the four masks process, a half-tone mask is used to concurrently form the source and drain electrodes and the active layer, wherein a photoresist film is patterned and etched using the half-tone mask. Alternatively, a slit-type mask having a slit pattern with a resolution less than a normal resolution is inserted for an etch in the exposure process of the photoresist film.

FIGS. 1 to 4 are cross sectional views of a method for fabricating a liquid crystal display device using a four masks process according to the related art. In FIG. 1, a metal film, such as aluminum (Al), chromium (Cr) or the like, is deposited on a transparent insulating substrate 10 using a sputtering method. Then, a photoresist film is coated onto the metal film and is exposed to light using a first mask to form a photoresist pattern. Next, the metal film is wet-etched using the photoresist pattern as an etch mask to form a gate electrode 1, a gate bus line 21, and a gate pad 11 on the transparent insulating substrate 10. In addition, the gate electrode 1, gate bus line 21, and gate pad 11 may include an additional conductive layer formed exclusively on upper surfaces of the gate electrode 1, gate bus line 21, and gate pad 11.

In FIG. 2, a gate insulating layer 3, an amorphous silicon film (a-Si:H) 5, and an n+ doped amorphous silicon film 7 are sequentially deposited onto the transparent insulating substrate 10. Next, a metal film is deposited on the transparent insulating substrate 10. Then, a photoresist film is coated onto the metal film and is exposed and developed by using a second mask to form a photoresist pattern.

The second mask includes a slit such that a half-tone pattern is used to form a channel layer region of the amorphous silicon film (a-Si:H) 5. Accordingly, the amount of light irradiated onto the photoresist film through the slit of the second mask is decreased. Thus, the region of the photoresist film corresponding to the region of the slit of the second mask receives only a portion of the irradiated light.

Then, an etch process is performed to simultaneously form the source electrode 9a, the drain electrode 9b, the data bus line, the data pad 31, the ohmic contact layer 7, and the channel layer 5. In other words, a single masking process enables simultaneously formation of the source electrode 9a, the drain electrode 9b, the data bus line, the data pad 31, the ohmic contact layer 7, and the channel layer 5, thereby decreasing the total number of mask steps.

In FIG. 3, a passivation film 13 is formed on the transparent insulating substrate 10. Then, contact holes are formed in the passivation film 13 using a third mask step to expose the gate pad 11 and the data pad 31.

In FIG. 4, a transparent conductive film of ITO is deposited along an entire surface of the transparent insulating substrate 10. Then, a photoresist film is coated onto the ITO film and patterned by using a fourth mask to form the pixel electrode 15, a gate pad pattern 25, and a data pad pattern 27. The pixel electrode 15 is formed to overlap the gate bus line 21 to form an auxiliary capacitance with the gate bus line 21.

However, as detailed above, manufacturing costs of the LCD devices are considerably higher using a four mask fabrication process-than costs associated with a three mask fabrication process. Accordingly, an LCD array substrate fabricated using a three masks process would result in lower costs and increase an overall time to fabricate the LCD array substrate. In addition, since large-sized LCD devices require increasing the lengths of the gate and data bus lines, low resistance wirings are required.

SUMMARY OF THE INVENTION

Accordingly, the present invention is directed to a liquid crystal display device and a method of fabricating a liquid crystal display device that substantially obviate one or more problems due to limitations and disadvantages of the related art.

An object of the present invention is to provide a liquid crystal display device having an increased capacitance and low resistance wiring structure.

Another object of the present invention is to provide a method of fabricating a liquid crystal display device having a reduced number of mask processes.

Another object of the present invention is to provide a method for fabricating a liquid crystal display device having a reduced number of chemical treatment processes.

Additional features and advantages of the invention will be set forth in the description which follows, and in part will be apparent from the description, or may be learned by practice of the invention. The objectives and other advantages of the invention will be realized and attained by the structures particularly pointed out in the written description and claims hereof as well as the appended drawings.

To achieve these objects and other advantages and in accordance with the purpose of the invention, as embodied and broadly described, a method of fabricating a liquid crystal display device includes forming a gate electrode, a gate bus line, and a gate pad on a substrate using a first mask process, forming a gate insulating layer and an active layer on an entire surface of the substrate, forming a first organic material film on an entire surface of the substrate, removing a portion of the first organic material film to expose a first portion of the gate pad, depositing a transparent film on an entire surface of the substrate, patterning the transparent film using a second half-tone mask to form a data bus line, a source electrode, a drain electrode, a pixel electrode, a channel layer, and an ohmic contact layer, exposing portions of the data pad and data bus line using a third mask, forming a second organic material film on an entire surface of the substrate, depositing a low resistance material on the data bus line, coating a passivation film on the substrate, removing the second organic material film using a lift-off process to expose a second portion of the gate pad and a first portions of the data pad.

In another aspect, a method of fabricating a liquid crystal display device includes forming a gate electrode, a gate bus line, and a gate pad on a substrate, forming a gate insulating layer, an active layer, and a transparent film on an entire surface of the substrate, patterning the active layer and transparent conductive film to form a data bus line, a data pad, a source electrode, a drain electrode, a pixel electrode, a channel layer, and an ohmic contact layer, forming a passivation layer on an entire surface of the substrate, and exposing portions of the gate and data pads, wherein the data bus line, and the source, drain, and pixel electrodes include the transparent conductive film.

In another aspect, a liquid crystal display device includes a gate electrode, a gate bus line, and a gate pad on a substrate, a data bus line and data pad on the substrate, a gate insulating layer an entire surface of the substrate, an active layer on a portion of the gate insulating layer, a source electrode, a drain electrode, and a pixel electrode on the active layer, and a low resistance material on the data bus line, wherein the data bus line, the gate and data pads, the source and drain electrodes, and the pixel electrode are formed of transparent conductive material.

In another aspect, a liquid crystal display device includes a gate bus line on a substrate, a gate insulating layer formed on the gate bus line, an active layer formed on the gate insulating layer, and an auxiliary capacitor electrode including indium tin oxide film formed exclusively on the active layer.

It is to be understood that both the foregoing general description and the following detailed description of the present invention are exemplary and explanatory and are intended to provide further explanation of the present invention as claimed.

BRIEF DESCRIPTION OF THE DRAWINGS

The accompanying drawings, which are included to provide a further understanding of the present invention and are incorporated in and constitute a part of this application, illustrate embodiments of the present invention and together with the description serve to explain the principle of the present invention. In the drawings.

DETAILED DESCRIPTION OF THE PREFERRED EMBODIMENTS

Reference will now be made in detail to a preferred embodiment of the present invention with reference to the accompanying drawings.

Figure 1:
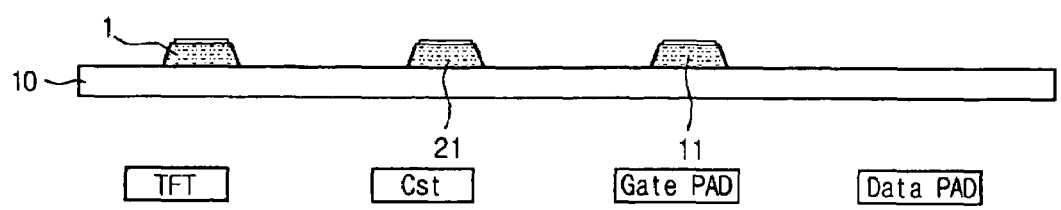
FIG. 1 is a cross sectional view of a method for fabricating a liquid crystal display device using a four masks process according to the related art.
Figure 2:
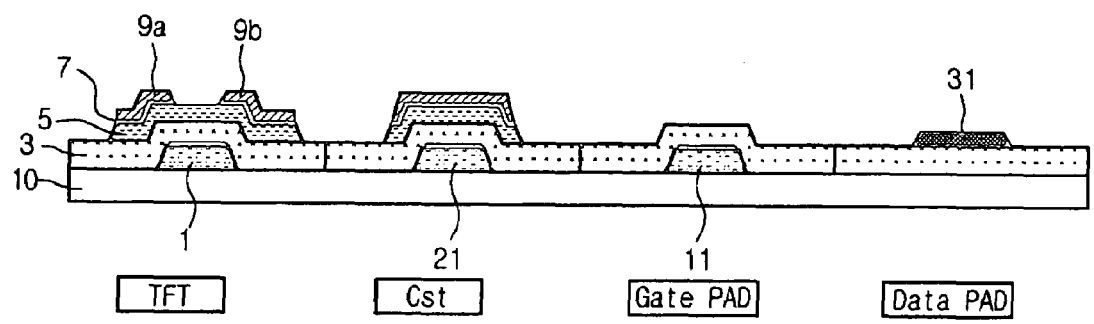
FIG. 2 is a cross sectional view of a method for fabricating a liquid crystal display device using a four masks process according to the related art.
Figure 3:
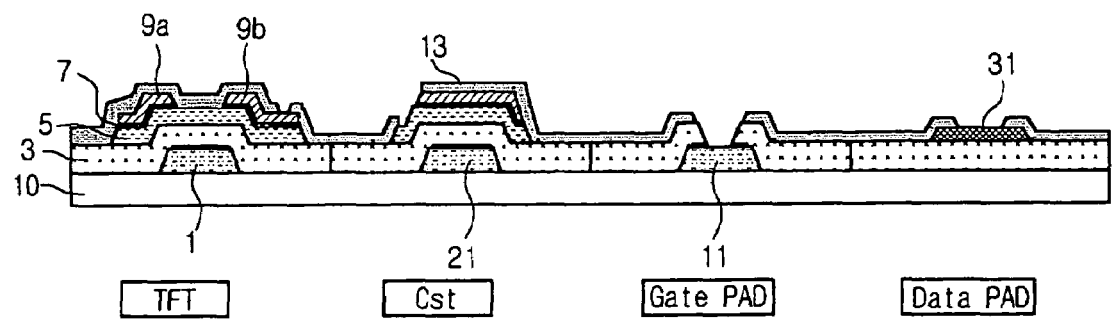
FIG. 3 is a cross sectional view of a method for fabricating a liquid crystal display device using a four masks process according to the related art.
Figure 4:
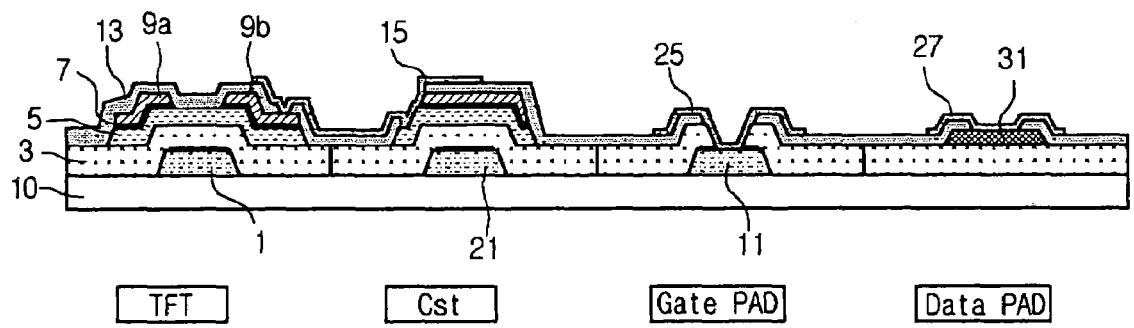
FIG. 4 is a cross sectional view of a method for fabricating a liquid crystal display device using a four masks process according to the related art.
Figure 5:
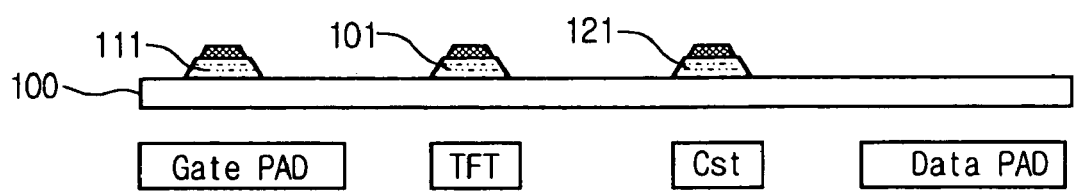
FIG. 5 is a cross sectional .view of an exemplary method for fabricating a liquid crystal display device using three masks process according to the present invention.

FIGS. 5 to 15 are cross sectional and plan views of an exemplary method for fabricating a liquid crystal display device using a three masks process according to the present invention. In FIG. 5, a metal film, such as aluminum (Al), chromium (Cr) or the like, may be deposited upon a transparent lower substrate 100 using a sputtering method, for example. Then, a photoresist film may be coated onto the metal film and exposed to light using a first mask. Next, the exposed portions of the photoresist film may be developed, thereby forming a photoresist pattern such that a portion of the photoresist film is removed at regions corresponding to a portion of the metal film that is to be etched. Then, the metal film is partly etched by a wet etching process, for example, using the photoresist pattern as an etch mask to form a gate electrode 101, a gate pad 111, and a gate bus line 121 on the transparent lower substrate 100. In addition, the gate electrode 101, gate pad 111, and gate bus line 121 may include an additional conductive layer formed exclusively on upper surfaces of the gate electrode 101, gate pad 111, and gate bus line 121 in order to reduce contact resistance. For example, a silicide material may be formed on the upper surfaces of the gate electrode 101, gate pad 111, and gate bus line 121

Figure 6A:
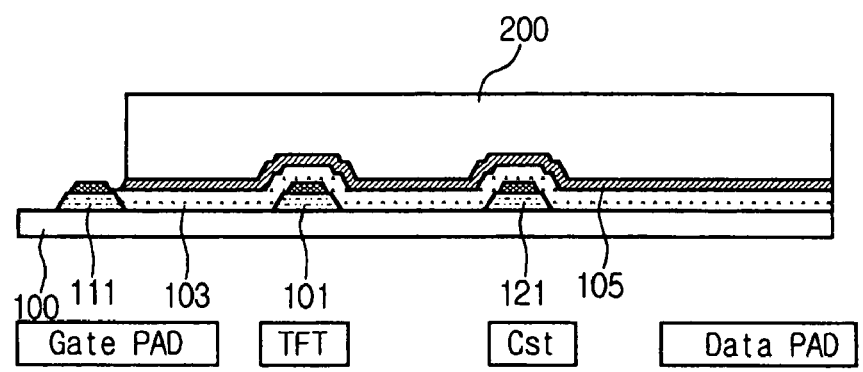
FIG. 6A is a cross sectional view of an exemplary method for fabricating a liquid crystal display device using three masks process according to the present invention.

In FIG. 6A, a gate insulating layer 103 is deposited along an entire surface of the transparent lower substrate 100 and the gate electrode 101, the gate pad 111, and the gate bus line 121. Next, an amorphous silicon film (a-Si:H) and an n+ doped amorphous silicon film may be sequentially deposited on the transparent lower substrate 100 to form an active layer 105. For example, the gate insulating layer 103 and the active layer 105 may be formed using a Plasma Enhanced Chemical Vapor Deposition (PECVD) chamber. Then, a first organic film 200 may be printed onto an entire region of the transparent lower substrate 100, except for a gate pad region, to form a printed region 501 (in FIG. 6B).

Figure 6B:
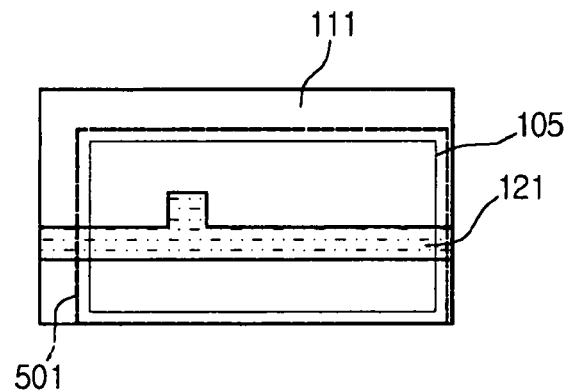
FIG. 6B is a plane view of an exemplary method for fabricating a liquid crystal display device using three masks process according to the present invention.

In FIG. 6B, the printed region 501 may include the first organic film 200, but the gate pad region may exclude the first organic film 200. Accordingly, the first organic film 200 may be printed within a region upon which pixel regions may be formed, but may not be printed within regions other than the pixel regions so that the active layer is exposed. Next, the transparent lower substrate 100 may be dry-etched to expose portions of the active layer 105 deposited within the gate pad region.

Figure 7:
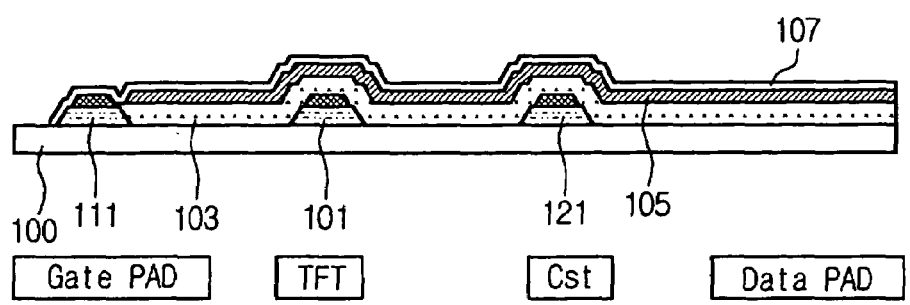
FIG. 7 is a cross sectional view of an exemplary method for fabricating a liquid crystal display device using three masks process according to the present invention.

In FIG. 7, the printed first organic film 200 may be completely removed and a transparent conductive film 107, such as Indium Tin Oxide (ITO), may be deposited on an entire surface of the transparent lower substrate 100 using a sputtering method, for example. The ITO film 107 may be used for source, drain, and pixel electrodes of a thin film transistor (TFT) that may be subsequently formed on the transparent lower substrate 100. Accordingly, the source, drain, and pixel electrodes may be integrally formed on the transparent lower substrate 100, wherein separate formation of individual contact holes to electrically connect the drain electrode with the pixel electrode may not be necessary.

Figure 8:
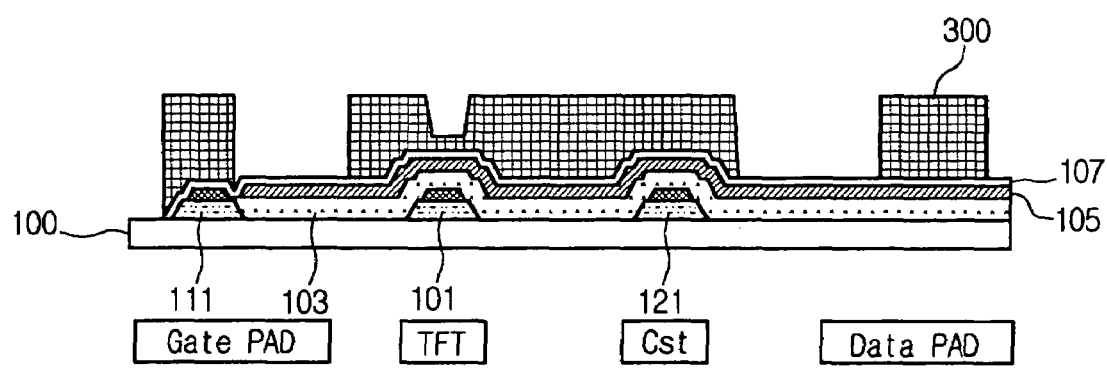
FIG. 8 is a cross sectional view of an exemplary method for fabricating a liquid crystal display device using three masks process according to the present invention.

In FIG. 8, a photoresist film may be coated on the transparent lower substrate 100 including the ITO film 107. Then, the photoresist film may be exposed to form a half-tone pattern 300 using a second mask. For example, a first portion of the photoresist film may be partially exposed by a predetermined amount within a channel of the TFT region, a second portion of the photoresist film may not be exposed within source and drain electrode regions, and a third portion of the photoresist film may be fully exposed within a region to be completely etched, thereby forming the half tone pattern 300.

Figure 9A:
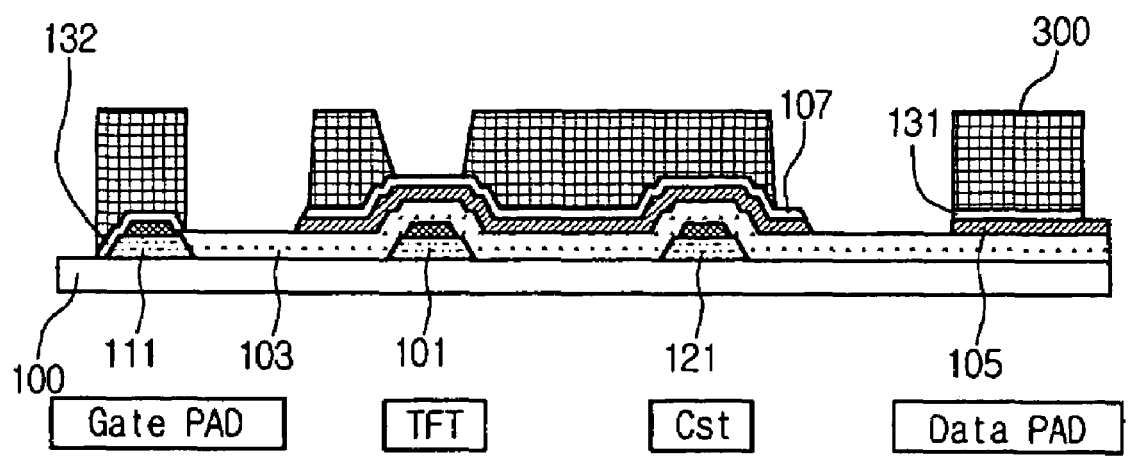
FIG. 9A is a cross sectional view of an exemplary method for fabricating a liquid crystal display device using three masks process according to the present invention.

In FIG. 9A, the ITO film 107 may be wet-etched using the half-tone pattern 300, thereby forming a gate pad pattern 132, a data pad pattern 131, and a first portion of the ITO film 107 overlaying the TFT region may be removed. Accordingly, second portions of the ITO film 107 may remain within the TFT regions that may be used to form source and drain electrodes 107a and 108 (in FIG. 10A) on the amorphous silicon (a-Si:H) and n+ doped amorphous silicon films of the active layer 105 and a pixel electrode 108 (in FIG. 10A) that may be continuous with the drain electrode 108 (in FIG. 10A). In addition, a portion of the active layer 105 corresponding to the channel of the TFT region may be partially dry-etched to form an ohmic contact layer and a channel layer within the TFT region, and the half-tone pattern 300 may be removed.

Figure 9B:
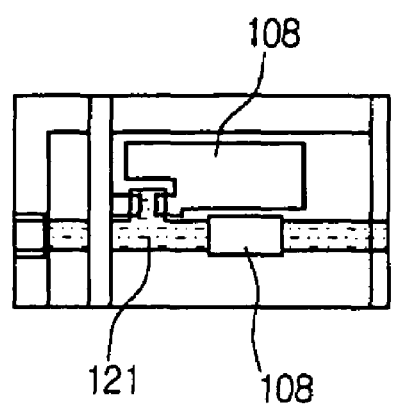
FIG. 9B is a plane view of an exemplary method for fabricating a liquid crystal display device using three masks process according to the present invention.

In FIG. 9B, an auxiliary capacitor electrode 108 may be simultaneously formed on the transparent lower substrate 100 when the second portions of the ITO film 107 are formed. Accordingly, the drain and pixel electrodes 108 (in FIG. 10A) and the auxiliary capacitor electrode 108, which is separate from the drain and pixel electrodes 108 (in FIG. 10A), may be integrally formed of the ITO film 107.

According to the present invention, the drain and pixel electrodes 108 (in FIG. 10A), the auxiliary capacitor electrode 108 (in FIG. 9B), the data bus line (not shown), the data pad 131, and the source electrode 107a (in FIG. 10A) may be simultaneously formed together on the same plane after two masking steps. In addition, the source, drain, and pixel electrodes 107a and 108 (in FIG. 10A) and the auxiliary capacitor electrode 108 (in FIG. 9B) may be formed from a common ITO film.

Since the pixel electrode 108 (in FIG. 10A), the data bus line (not shown), the data pad 131, the source electrode 107a (in FIG. 10A), the drain electrode 108 (in FIG. 10A), and the auxiliary capacitor electrode 108 (in FIG. 9B) are formed from a common ITO film, an auxiliary capacitance demonstrates a characteristic structure. The auxiliary capacitance is configured to have a section structure comprising a gate bus line 121, a gate insulating layer 103 formed on the gate bus line 121, an active layer 105 formed on the gate insulating layer 103, and the ITO film 108 formed on the active layer 105.

Furthermore, the active layer 105 may be completely formed on a lower side surface of the ITO pixel electrode 108. Accordingly, no passivation films or interlayer step portion are introduced on the lower side surface of the pixel electrode 108, and the active layer 105 may be provided as a single layer.

Figure 10A:
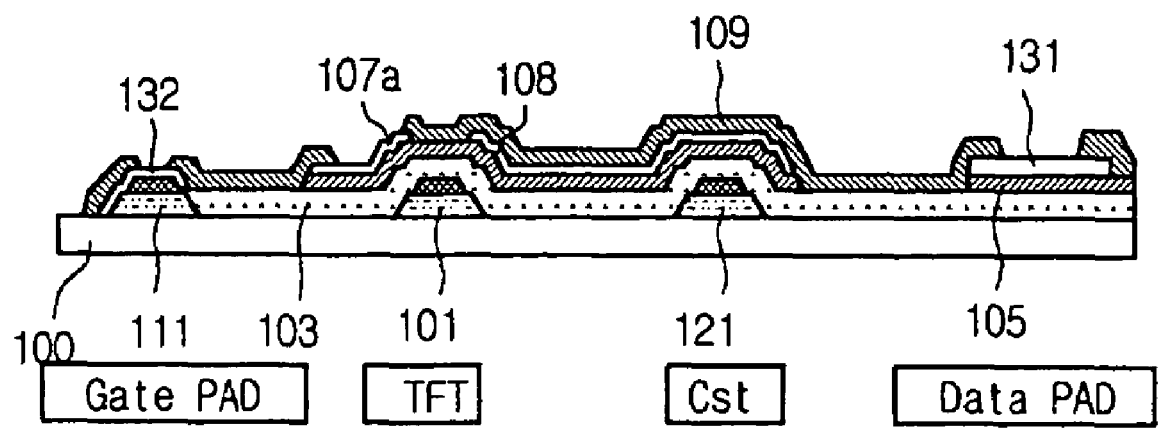
FIG. 10A is a cross sectional view of an exemplary method for fabricating a liquid crystal display device using three masks process according to the present invention.

In FIG. 10A, a first passivation film 109 may be deposited on the transparent lower substrate 100 including the source electrode 107a and the drain and pixel electrodes 108. Then, using a third masking process, the first passivation film 109 may be patterned to expose a portion of the ITO film overlapping the gate pad 111, the data pad 131, the data bus line (not shown), and the source electrode 107a. The data bus line may transmit image signals to be supplied to the pixel electrode 108 via the TFT within the TFT region. For example, the data bus line (not shown) may be formed of a metallic pattern having a low resistance, since the ITO film may not be suitable for the data bus line due to its relatively high resistance. However, the data bus line may be simultaneously formed with the source electrode 107a using the ITO film.

Figure 10B:
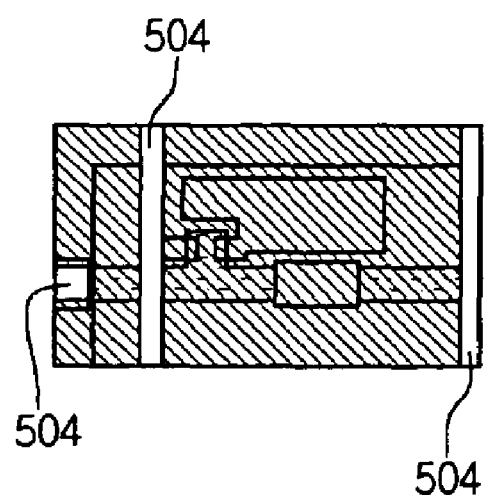
FIG. 10B is a plane view of an exemplary method for fabricating a liquid crystal display device using three masks process according to the present invention.

In FIG. 10B, a first region 504 of the first passivation film 109 that corresponds to the data bus line may be removed, and a second region 504 of the first passivation film 109 that corresponds to the gate pad region may be removed.

Figure 11:
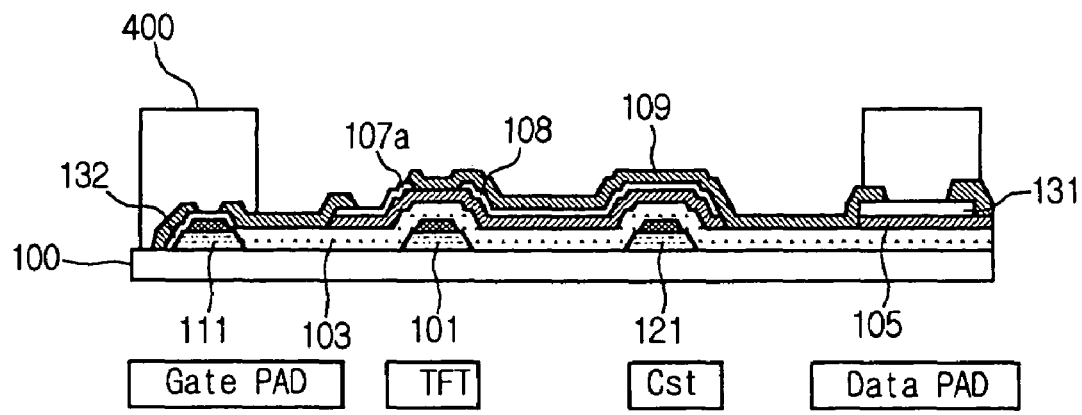
FIG. 11 is a cross sectional view of an exemplary method for fabricating a liquid crystal display device using three masks process according to the present invention.

In FIG. 11, a second organic film 400 may be provided on the gate pad region and the data pad region using a printing process, for example.

Figure 12A:
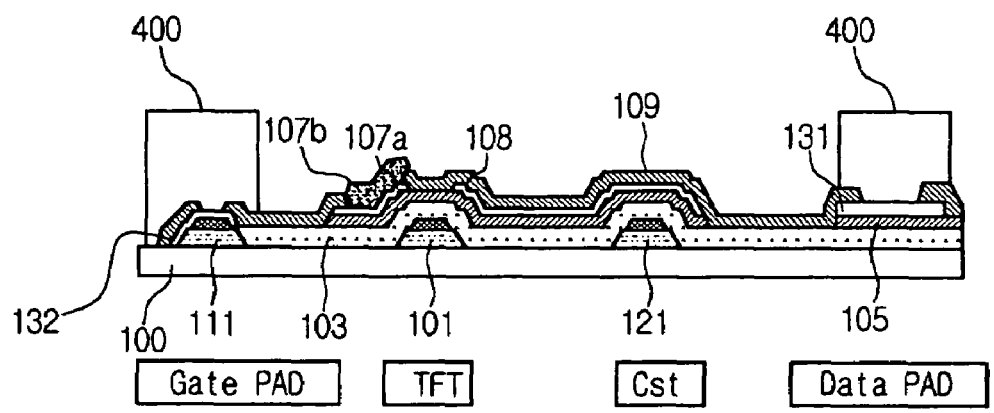
FIG. 12A is a cross sectional view of an exemplary method for fabricating a liquid crystal display device using three masks process according to the present invention.

In FIG. 12A, a metallic pattern, such as copper (Cu), silver (Ag), aurum (Au), titanium (Ti) and tungsten (W), having a low resistance may be deposited on the data bus line 507 (in FIG. 12B), using a plating method, such as electroplating or electroless plating, to form a low resistance data bus line 107b.

During the electroless plating method, a copper film may be formed on the ITO source electrode 107a using a reduction reaction of copper ions in a plating solution, so that the low resistance data bus line 107b is formed. In addition, the reduction reaction may be accelerated by adding platinum (Pt), a processing temperature may be within a range of about 20~70° C., and pH may be within a range of about 9.0~13.0. Furthermore, the electroless plating solution may include a mixture of copper sulfate for supplying the copper ion, formalin for supplying electrons, and Rochelle salt for lengthening the life span of the electroless plating solution.

During the electro-plating method, the data bus line 107b, upon which the low resistance metal film is being plated, may be charged as a cathode and the low resistance metal film, such as Cu, Ag, Au, Ti and W, may be charged as an anode. Then, the transparent lower substrate 100 is dipped in an electrolyte solution containing ions of the low resistance metal film to be plated, and a voltage is supplied between the anode and cathode. Accordingly, the low resistance metal may be coated only on the data bus line 507 (in FIG. 12B), which is an ITO film, and may not be coated on the passivation film 109.

Figure 12B:
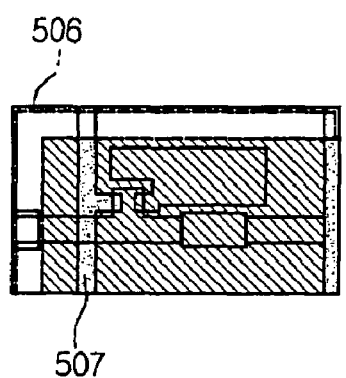
FIG. 12B is a plane view of an exemplary method for fabricating a liquid crystal display device using three masks process according to the present invention.

In FIG. 12B, a second organic film printed region 506 may be covered with the second organic film 400 (in FIG. 12A), and the metal film may not be plated within the data and gate pad regions.

Figure 13A:
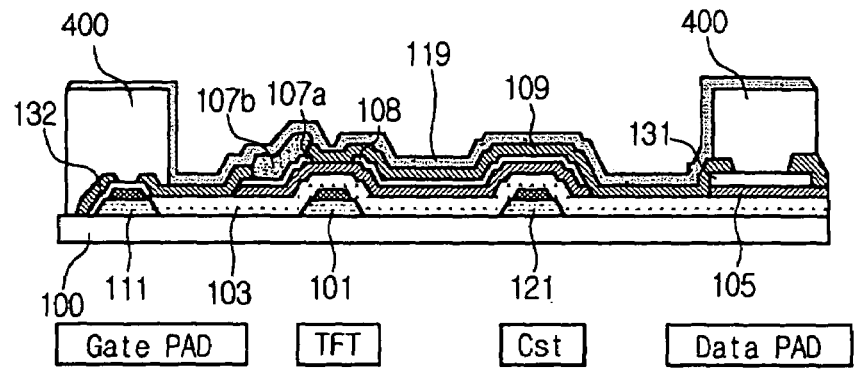
FIG. 13A is a cross sectional view of an exemplary method for fabricating a liquid crystal display device using three masks process according to the present invention.

In FIG. 13A, a second passivation film 119, such as SiNx, may be deposited on an entire surface of the transparent lower substrate 100 including the gate and data pad patterns 132 and 131 upon which the second organic film 400 is printed. The second passivation film 119 may be deposited for protecting the data bus line 107b from external impact, and may be deposited on the second organic film 400.

Figure 13B:
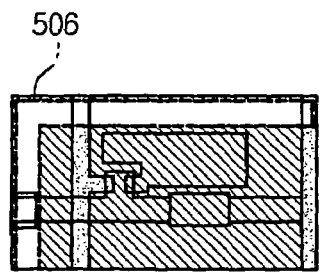
FIG. 13B is a plane view of an exemplary method for fabricating a liquid crystal display device using three masks process according to the present invention.

In FIG. 13B, the second organic film printed region 506 is covered with the second organic film 400.

Figure 14:
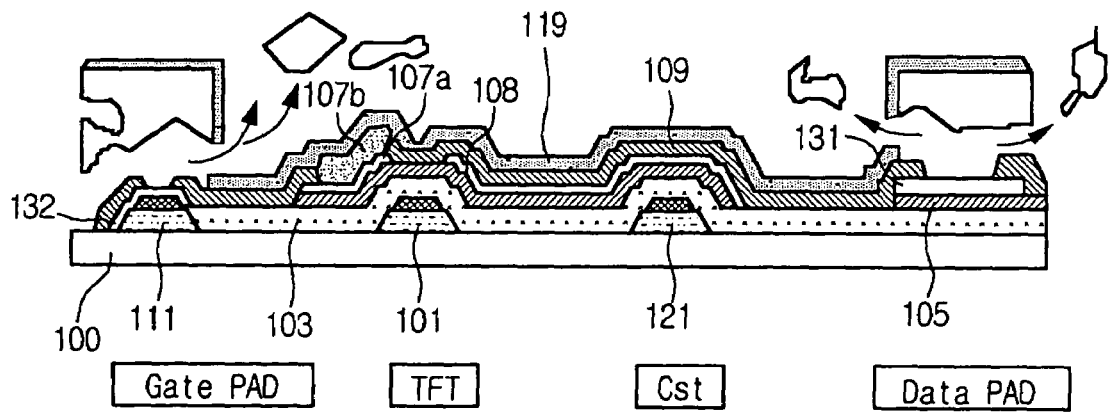
FIG. 14 is a cross sectional view of an exemplary method for fabricating a liquid crystal display device using three masks process according to the present invention.

In FIG. 14, the transparent lower substrate 100 may be dipped into a solution for dissolving the second organic film 400. Accordingly, since the second passivation film 119 does not react with the solution, only first portions of the second passivation film 119 overlying the second organic film 400 may be removed with the second organic film 400. Thus, the gate pad and data pad patterns 132 and 131 may be exposed.

Figure 15A:
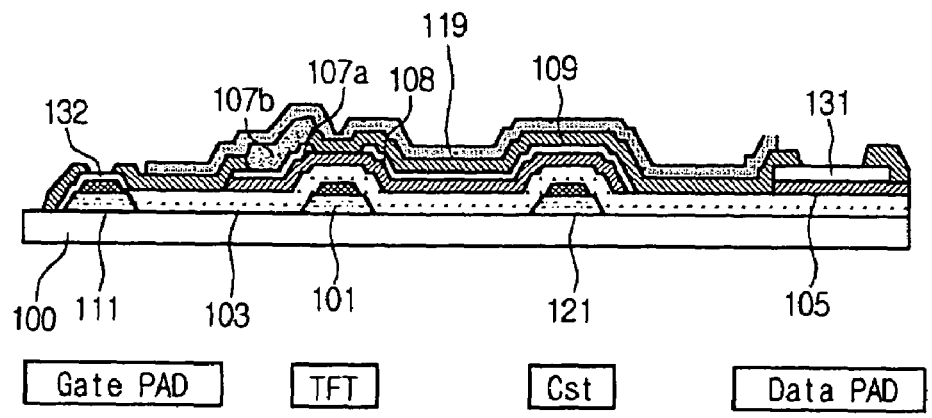
FIG. 15A is a cross sectional view of an exemplary method for fabricating a liquid crystal display device using three masks process according to the present invention.
Figure 15B:
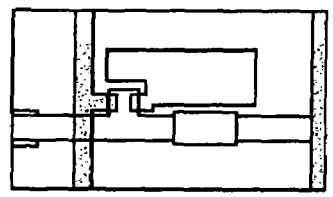
FIG. 15B is a plane view of an exemplary method for fabricating a liquid crystal display device using three masks process according to the present invention.

In FIG. 15, second portions of the second passivation film 119 overlying the TFT and Cst regions may remain on the first passivation film 109.

Figure 16:
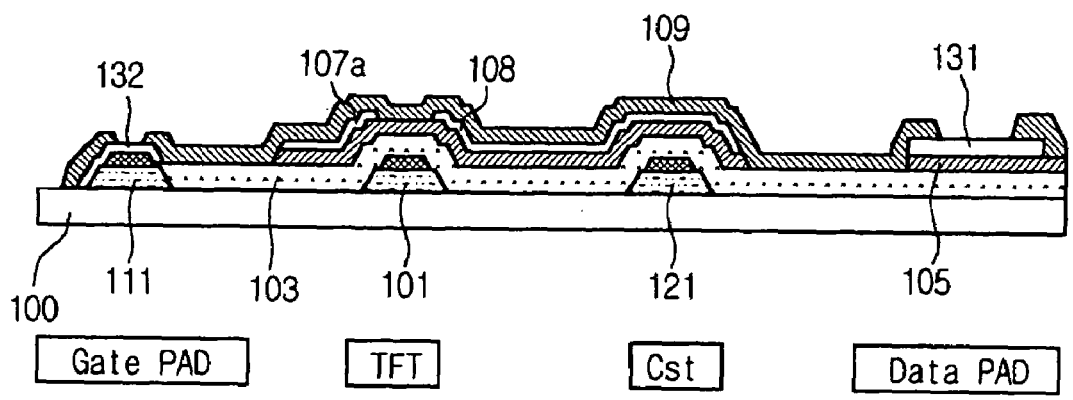
FIG. 16 is a cross sectional view of an exemplary process for fabricating a liquid crystal display device according to the present invention.

FIG. 16 is a cross sectional view of an exemplary process for fabricating a liquid crystal display device according to the present invention. Processes for fabricating the liquid crystal display device may include the processes shown in FIGS. 5-9, but may include forming the data bus line from the ITO film used to form the source, drain, pixel, and auxiliary capacitor electrodes. In FIG. 16, the passivation film 109 may cover and passsivate an upper side surface of the data bus line formed together with the pixel electrode 107a and the pixel electrode 108.

It will be apparent to those skilled in the art that various modifications and variations can be made in the liquid crystal display device and method of fabricating a liquid crystal display device of the present invention without departing from the spirit or scope of the invention. Thus, it is intended that the present invention covers the modifications and variations of this invention provided they come within the scope of the appended claims and their equivalents.

What is claimed is:

1. A method of fabricating a liquid crystal display device, comprising the steps of:
    forming a gate electrode, a gate bus line, and a gate pad on a substrate using a first mask process;
    forming a gate insulating layer and an active layer on an entire surface of the substrate;
    forming a first organic material film on an entire surface of the substrate;
    moving a portion of the first organic material film to expose a first portion of the gate pad;
    depositing a transparent film on an entire surface of the substrate;
    patterning the transparent film using a second half-tone mask to form a data bus line, a source electrode, a drain electrode, a pixel electrode, a channel layer, and an ohmic contact layer;
    exposing portions of the data pad and data bus line using a third mask;
    forming a second organic material film on an entire surface of the substrate;
    depositing a low resistance material on the data bus line;
    coating a passivation film on the substrate;
    removing the second organic material film using a lift-off process to expose a second portion of the gate pad and a first portions of the data pad.

2. The method according to claim 1, wherein the pixel electrode, the source electrode, the drain electrode, and the data bus line are simultaneously formed on the active layer.

3. The method according to claim 1, wherein the transparent electrode material includes indium tin oxide.

4. The method according to claim 1, wherein the low resistance material includes at least one of Cu, Ag, Au, Ti, and W.

5. The method according to claim 1, wherein the step of depositing a low resistance material includes one of an electrical plating method and an electroless plating method.

6. The method according to claim 1, wherein the step of removing a portion of the first organic material film includes an etching process.

7. A method of fabricating a liquid crystal display device, comprising the steps of:
    forming a gate electrode, a gate bus line, and a gate pad on a substrate;
    forming a gate insulating layer, an active layer, and a transparent conductive film on an entire surface of the substrate;
    patterning the active layer and the transparent conductive film to concurrently form a data bus line, a data pad, a source electrode, a drain electrode, a pixel electrode, a channel layer, and an ohmic contact layer;

forming an organic material film on the gate and data pads;

forming a passivation layer on an entire surface of the substrate including the organic material film; and exposing portions of the gate and data pads, wherein the data bus line, and the source, drain, and pixel electrodes include the transparent conductive film.

8. The method according to claim 7, wherein the step of patterning the active layer and the transparent conductive film includes a half-tone mask.

9. The method according to claim 7, wherein the transparent conductive film includes indium tin oxide.

10. The method according to claim 7, wherein the step of exposing the gate and data pads includes removing the organic material film using a lift-off method.

11. The method according to claim 7, further comprising a step of forming a low resistance metal on the source electrode before the step of exposing the gate and data pads.

12. The method according to claim 11, wherein the low resistance metal includes at least one of Cu, Ag, Au, Ti, and W.

13. The method according to claim 7, wherein the organic material film is formed by a printing method.

* * * * *